United States Patent
Woodall et al.

(10) Patent No.: US 9,056,769 B1
(45) Date of Patent: Jun. 16, 2015

(54) METHOD AND APPARATUS FOR PRODUCING HYDROGEN AND ALUMINUM OXIDE FROM SOLID ALUMINUM

(71) Applicants: Jerry M. Woodall, Davis, CA (US); Thomas E. Rowley, San Jose, CA (US)

(72) Inventors: Jerry M. Woodall, Davis, CA (US); Thomas E. Rowley, San Jose, CA (US)

( * ) Notice: Subject to any disclaimer, the term of this patent is extended or adjusted under 35 U.S.C. 154(b) by 0 days.

(21) Appl. No.: 14/261,791

(22) Filed: Apr. 25, 2014

Related U.S. Application Data

(60) Provisional application No. 61/815,856, filed on Apr. 25, 2013, provisional application No. 61/819,787, filed on May 6, 2013.

(51) Int. Cl.
| | |
|---|---|
| *C01B 3/00* | (2006.01) |
| *C01B 3/08* | (2006.01) |
| *C01F 7/42* | (2006.01) |
| *C01B 3/04* | (2006.01) |

(52) U.S. Cl.
CPC ... *C01B 3/08* (2013.01); *C01F 7/42* (2013.01); *C01B 3/042* (2013.01)

(58) Field of Classification Search
None
See application file for complete search history.

(56) References Cited

U.S. PATENT DOCUMENTS

| 4,358,291 A | 11/1982 | Cuomo et al. |
| 8,080,233 B2 | 12/2011 | Woodall et al. |

*Primary Examiner* — Melvin C Mayes
*Assistant Examiner* — Kenneth Vaden

(57) ABSTRACT

A method and apparatus for producing hydrogen and a passivating oxide using water splitting techniques is disclosed. The apparatus comprises a container filled with a passivating-oxide preventing agent that is substantially inert to water in an effective amount to prevent passivation of a solid-state material during oxidation and a means for inserting a solid-state material into the passivating-oxide preventing agent in which the solid-state material is submerged in the passivating-oxide preventing agent without being in direct contact with water. The solid-state material is capable of dissolving in the passivating-oxide preventing agent and reacting with the water. Thus, the method provides continuous dissolution of the solid-state material into the passivating-oxide preventing agent and its alloys in the presence of excess water at or near room temperature to enable continuous generation of hydrogen, passivating oxide and heat.

14 Claims, 2 Drawing Sheets

METHOD AND APPARATUS FOR PRODUCING HYDROGEN AND ALUMINUM OXIDE FROM SOLID ALUMINUM

CROSS-REFERENCE TO RELATED APPLICATIONS

The present application claims priority from the U.S. provisional application with Ser. No. 61/815,856, which was filed on Apr. 25, 2013 and from U.S. provisional application Ser. No. 61/819,787, which was filed on May 6, 2013. The disclosure of these provisional applications are incorporated herein as if set out in full.

BACKGROUND OF THE DISCLOSURE

1. Technical Field of the Disclosure

The present embodiment relates in general to a method and apparatus for generating hydrogen. More specifically, the present disclosure relates to a method and apparatus for producing hydrogen and aluminum oxide from solid aluminum using water splitting techniques.

2. Description of the Related Art

Hydrogen can be generated by a variety of methods. Hydrogen can be generated by natural gas reforming, electrolysis, thermochemical reaction and photo catalytic methodologies. These methodologies produce carbon dioxide as a by-product, which requires a substantially large amount of electrical energy which can be expensive and have a large, negative environmental impact. It requires solar energy with temperatures exceeding 1000 degrees Celsius; it requires highly corrosive reactants and/or products; and often requires expensive reagents, complex nanostructured solids, and/or sacrificial oxidants or reductants other than water.

A number of variants of the water split reaction used to produce hydrogen have been devised to overcome these problems. The water split reaction contemplates a fuel for splitting water into hydrogen and an oxide. In these reactions aluminum is used to generate hydrogen from water. Commonly, aluminum oxide compounds can be produced from bauxite ores by Bayer's process. In the water splitting process, the hydrogen is released as a gas and the oxygen combines with the aluminum to form the aluminum oxide compounds. The aluminum oxide compounds are produced as a protective oxide layer on the aluminum in contact with water at ambient temperature.

Aluminum has a tendency to be self-protecting by forming the aluminum oxide that inhibits reactions required for the formation of hydrogen and thus in some cases is difficult, if not, impossible to use on a long term basis. Therefore, it has been accepted by those skilled in the art that the use of aluminum in a reaction with water to generate hydrogen gas requires that the protective oxide layer is efficiently and continuously removed, and that the reaction is kept at an elevated temperature.

In one prior art reference, U.S. Pat. No. 4,358,291, the inventors disclosed that if aluminum (Al) is dissolved in a liquid solution of gallium (Ga) or a liquid mixture of Ga and indium (In) at or near room temperature, and brought into contact with water, the Al in the liquid solution at the water interface would split water molecules ($H_2O$) into hydrogen gas, alumina ($Al_2O_3$), and generate heat. This reaction will proceed until all elemental Al in the liquid solution is converted to alumina. The solid aluminum (Al) will dissolve in dry, air exposed liquid melts of gallium (Ga), Ga-indium (Ga—In), or Ga—In-tin (Ga—In—Sn) at or near room temperature up to the solubility limit, about 2-3 weight percent Al.

When Al is dissolved in liquid Ga and is brought into contact with water, the Al that is dissolved in the Ga is no longer passivated by its oxide. The result is that the Al at the water-Ga metal solution interface will split water into hydrogen gas, heat and aluminum hydroxide. Thus, the reaction presents a technological barrier to continuously resupply depleted Ga melts with more Al in the presence of water. This barrier to further dissolution in the Ga melts is the result of an interface layer of water that formed between Ga surface and the floating Al surface in the presence of excess water. This water forms a more impervious aluminum oxide layer than that which forms on an Al surface exposed just to the air. As a result Ga is prevented from making direct contact with metallic Al under the oxide layer. However, it was subsequently discovered that, in the presence of excess water, once the Al that was dissolved in the Ga solution was depleted, and solid Al was floated on the Ga liquid surface, it would not continue to dissolve to replace the depleted Al.

In addition, if the liquid solution containing Al is cooled to the point of freezing into a solid solution, very little reaction will occur. This is because unlike the case for liquid solutions, where the Al atoms can continuously diffuse to water-solution interface and react until the Al has all reacted, Al atoms in the frozen solution cannot move to the interface. Hence, only those Al atoms at the frozen solution surface can react with water. Once the Al atoms at the frozen solution surface react with water, the reaction stops.

Another drawback of this approach is that if the Al that is dissolved in the liquid solution in a dry environment and reacted to completion in the presence of excess water, the liquid solution is now under saturated with respect to Al. This means that the liquid could theoretically be saturated with additional Al. When a solid piece of Al (whose density is less than liquid Ga) is floated on top of an under saturated liquid of Ga in the presence of excess water, the solid piece of Al will not dissolve into an under saturated Ga, Ga—In, or Ga—In-tin (Sn) liquid at or near room temperature. Further, the solid Al does not dissolve in under saturated liquid Ga in the presence of water due to the fact that there is a layer of water between the liquid Ga and the solid Al that forms a barrier layer of alumina that is thicker than the alumina layer that forms between Ga and Al in air. Attempts have been made to find other methods to cope with these problems. One method is to heat a mixture of solid Al and Ga (or Ga—In or Ga—In—Sn) in an inert container above the melting point of Al, and then return the melt mixture back to the room temperature. However, this method requires the use of crucible materials that will not react with Al melts and to empirically find optimal cooling rates and composition that will render the mixture suitable for practical applications.

Another existing prior art reference, U.S. Pat. No. 8,080,233, discloses a fuel for splitting water into hydrogen and an oxide component comprises a substantially solid pellet formed from a solid-like mixture of a solid-state source material capable of oxidizing in water to form hydrogen and a passivation surface layer of the oxide component, and a passivation preventing agent that is substantially inert to water in an effective amount to prevent passivation of the solid-state material during oxidation. The pellets are brought into contact with an alloy of the passivation preventing agent having a melting point temperature below that of the solid-like mixture to initiate the hydrogen-producing reaction at a lower temperature. However, the fuel does not include any means to prevent the aluminum pellets from coming into direct contact with water to provide continuous dissolution of the aluminum pellets in passivation preventing agent in the presence of excess water.

In light of the foregoing, there is a need for a method and apparatus for producing hydrogen and aluminum oxides from aluminum using water splitting techniques that avoids the inherent problems with current technologies. In fulfillment of this need, the inventors have discovered that Al will not readily dissolve in Ga melts if the Al is simultaneously in contact with both the Ga melt and in contact with water. They have subsequently discovered that if the Al is immersed in Ga without contact with water, the Al will continue to dissolve even though water may be in contact with Ga and Ga with dissolved Al. The inventive method and apparatus described herein continuously dissolves solid-state Al or other liquid metals into a liquid Ga and its alloys in the presence of excess water at or near room temperature to enable the continuous generation of hydrogen gas and the continuous production of economically important oxides of Al or other liquid metals. The method and apparatus includes a means for splitting water in which a solid-state Al is submerged in a liquid Ga and does not make contact with water. Furthermore, the method and apparatus consists of a solid-state Al submerged below a liquid Ga interface so that the solid-state material dissolves in the liquid Ga. Finally, the method and apparatus removes the barrier layer by continuously dissolving Al into liquid Ga in the present of excess water.

SUMMARY OF THE DISCLOSURE

To minimize the limitations found in the prior art, and to minimize other limitations that will be apparent upon the reading of the specification, the preferred embodiment of the present invention discloses a method and apparatus for producing hydrogen and a passivating oxide from solid aluminum using water splitting techniques. The apparatus comprises a container filled with a passivating-oxide preventing agent that is substantially inert to water in an effective amount to prevent passivation of a solid-state material during oxidation and a means for inserting a solid-state material into the passivating-oxide preventing agent in which the solid-state material is submerged in the passivating-oxide preventing agent without being in direct contact with water. The solid-state material is capable of dissolving in the passivating-oxide preventing agent and reacting with the water so as to generate hydrogen, passivating oxide and heat. In a preferred embodiment, the solid-state material is a rod of aluminum and the passivating oxide is aluminum oxide. The passivating-oxide preventing agent is molten gallium saturated with aluminum or alloys of the molten gallium.

In one embodiment, the liquid melt used in the hydrogen generation process is enhanced by the addition of a liquid-phase gallium-indium alloy that consist essentially of about 80% (eighty percent) gallium and 20% (twenty percent) indium (80/20 (Ga/In). In another embodiment, the liquid melt used in the hydrogen generation process is enhanced by the addition of a liquid-phase gallium-indium-tin alloy that consist essentially of 3% (three percent) by weight, and the Ga—In—Sn consist essentially of 68% (sixty-eight percent)-22% (twenty-two percent)-10% (ten percent).

The solid-state material is selected from the group consisting of: a strip of aluminum, a rod of aluminum, a pellet of aluminum, a tube of aluminum and a powder of aluminum and may be substantially pure aluminum or may contain other materials in the way of impurities or alloys so long as they do not impede the oxidation process and action of the passivating-oxide preventing agent.

A method for producing hydrogen and a passivating oxide using water splitting techniques is contemplated in one aspect of the invention that comprises providing a container filled with a liquid melt including molten gallium saturated with aluminum. The solid-state material is inserted into the liquid melt. Water is added to the container above a surface of the liquid melt. The aluminum saturated in the molten gallium is reacted with the water at a water-liquid interface so as to split the water into the hydrogen, passivating oxide and heat until the aluminum therein is depleted. Then, the solid-state material is submerged into the molten gallium without being in direct contact with the water so that the solid-state material dissolves in the molten gallium. The dissolved solid-state material is reacted with the water at the water-liquid interface so as to split the water into the hydrogen, passivating oxide and heat. The process is repeated until the solid-state material submerged is converted into the passivating oxide. Thus, the method provides continuous dissolution of the solid-state material into the passivating-oxide preventing agent and its alloys in the presence of excess water at or near room temperature to enable continuous generation of hydrogen, passivating oxide and heat.

The solid-state material is immersed in an Al saturate Ga melt at or near room temperature in the container. The water is added to the container above the surface of the Al saturate Ga melt and already dissolved Al split water into aluminum hydroxide, hydrogen gas and heat. As the pre-added Al is converted to aluminum hydroxide the parts of the solid-state material immersed in the Ga melt will dissolve to replace the converted Al. The process will continue until the solid-state material are continuously immersed into the Ga and are converted to aluminum hydroxide.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

Figure 1:
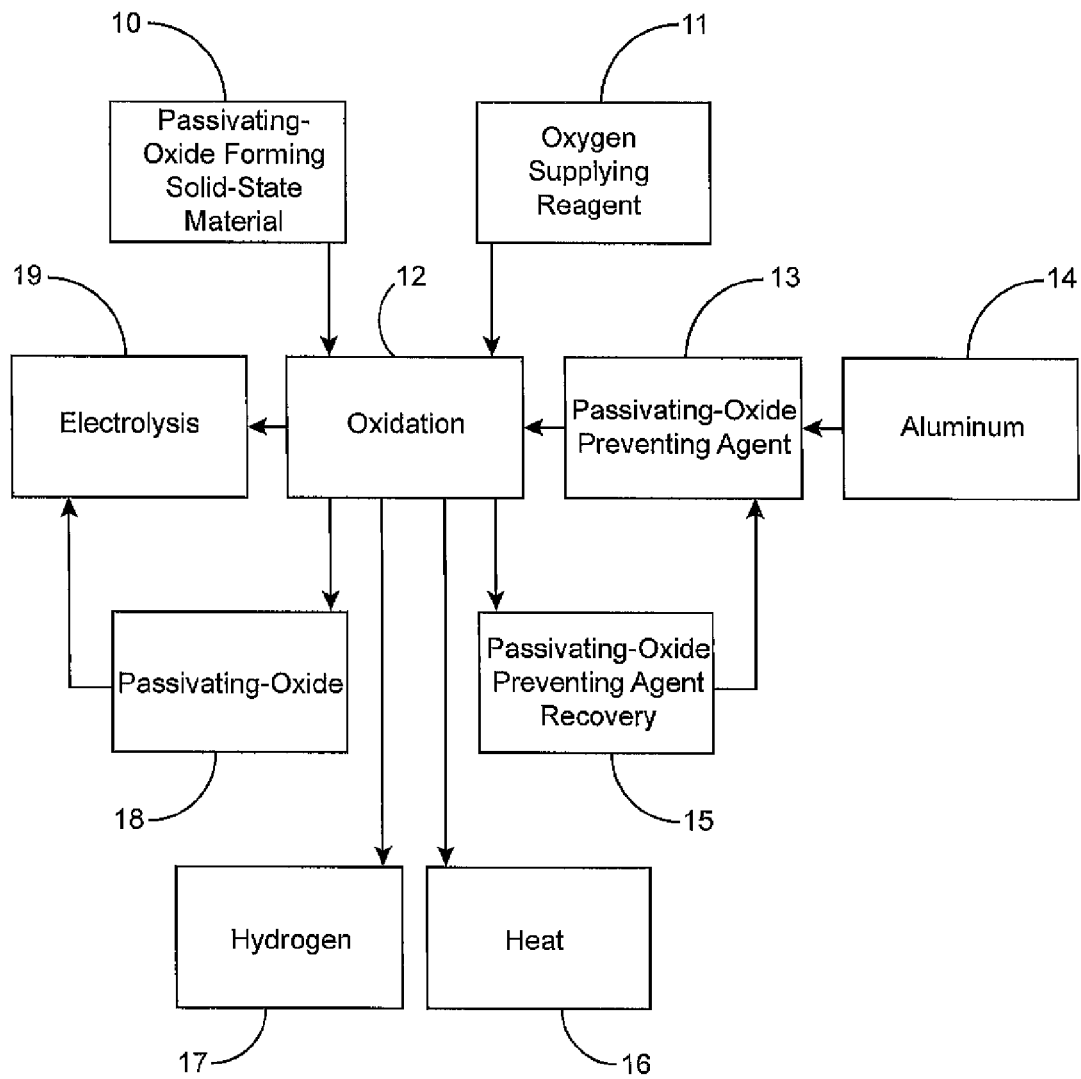
FIG. 1 illustrates a flow chart showing a closed cycle using a passivating-oxide forming solid-state material, an oxygen supplying reagent and a passivating-oxide preventing agent to produce hydrogen and a passivating oxide using water splitting techniques in accordance with the preferred embodiment of the present invention.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

For the purposes of promoting an understanding of the principles of the invention, reference will now be made to the embodiments illustrated in the drawings and described in the following written specification. It is understood that any alterations and modifications to the illustrated embodiments as would normally occur to one skilled in the art to which this invention pertains are encompassed with the scope of the invention.

In a preferred embodiment of the present invention, an apparatus is provided in which aluminum is reacted with water and/or hydrogen peroxide to produce hydrogen and heat. If hydrogen peroxide is used, oxygen is generated in addition to hydrogen. The aluminum is treated with a passivation preventing agent so that the aluminum reacts continuously with the water to split the water into hydrogen and aluminum oxide. The hydrogen may be provided to a power generation element, such as a fuel cell or a combustion engine in a vehicle. More broadly, the aluminum-to-hydrogen methods of the present invention may be combined with apparatuses that convert the hydrogen, oxygen and heat into electrical, mechanical or thermal power.

The solid-state material is a metallic aluminum that oxidizes at low or near room temperature, but as noted above forms a passivating oxide layer which inhibits further oxidation. In the present invention, the gallium serves as the passivating-oxide preventing agent that inhibits the passivation nature of the aluminum oxide layer and a means for splitting water in which the aluminum is submerged in the gallium and does not make contact with the water. According to one embodiment of the present invention, the Al—Ga to hydrogen conversion process is enhanced by the addition of a liquid-phase gallium-indium alloy. According to another embodiment of the present invention, the Al—Ga to hydrogen conversion process is enhanced by the addition of a liquid-phase gallium-indium-tin alloy. Gallium, gallium-indium, gallium-indium-tin and other suitable alloys are desirable because they become liquid at low temperatures and have low vapor pressures, thereby allowing a wide temperature window for the aluminum oxidation reaction.

The process for controlled oxidation of the aluminum using water as the oxygen supplying reagent and gallium as the passivating oxide inhibitor, follows these reaction equations:

$$2Al + 3H_2O \rightarrow Al_2O_3 + 3H_2 + \Delta E_1 \quad \quad 1)$$

$$2H_2 + O_2 \rightarrow 2H_2O + \Delta E_2 \quad \quad 2)$$

where $\Delta E1 = 407$ kJ/mole Al=15.1 kJ/g of aluminum, and $\Delta E2 = 286$ kJ/mole H2=429 kJ/mole Al=15.9 kJ/g of aluminum.

This process is renewable because the $Al_2O_3$ produced can be converted back into aluminum using reactions such as the following:

where $\Delta E3 = 877$ kJ/mole of Al=32.5 kJ/g of aluminum, and $\Delta E4 = 582$ kJ/mole of Al=21.6 kJ/g of aluminum.

The energy density of aluminum as a fuel compares extremely favorably to other known technologies, as demonstrated by the following Table I:

TABLE I

| Fuel | Energy Density (kJ/g) | Engine | Efficiency (%) | Net Power (kJ/g) | Emission Products |
|---|---|---|---|---|---|
| Aluminum | 31 | Stirling or Fuel Cell | 25-50 25 | 7.8-15.5 7.8 | $Al_2O_3$ $H_2O$ |
| Gasoline | 47.5 | Internal Combustion | 20-25 | 9.5-11.9 | $CO_2$, CO, $NO_x$, $SO_x$, etc. |
| Methanol | 23 | Reformer + Fuel Cell | 30-40 | 6.9-9.2 | $H_2O$, $CO_2$, CO |

It can first be noted that the emission products from the aluminum source are fully recyclable. The water may be recycled to provide additional oxidizer for the aluminum in the reaction process. The aluminum oxide is environmentally benign and readily recyclable into aluminum that can be reused to generate hydrogen. It can also be noted that in the Stirling engine the heat product of the reaction is also used in power generation. Even if only the hydrogen is used (as in the fuel cell), the resulting efficiency is still 25 percent.

Since gallium is inert, substantially all of the gallium contained in the aluminum-gallium mixture remains after the aluminum has been consumed. The gallium may be re-used and is hence nearly 100% recyclable.

As an aside, the overall efficiency of the aluminum source protocol should also consider the efficiency of recycling the Al2O3 back into usable aluminum. Applying Equations 3 and 4 above, the cycle efficiency ranges from 12-18 percent, where cycle efficiency is the energy generated by the oxidation of the aluminum divided by the energy required to recycle the aluminum. This cycle efficiency assumes that only 25% of the available energy of the oxidation process is captured as useful power. Obviously, if more energy is captured (such as the heat generated by the reactions in Equations 1 and 2) then the recycle efficiency will improve.

The process steps used in the present invention are illustrated in the flow chart of FIG. 1. A source of solid-state material 10 is dissolved in a passivating-oxide preventing agent 13 in a container 12 which prevents the formation of a passivating oxide 18 on the surface of the solid-state material 10. The submerged solid-state material 10 is then reacted with oxygen supplying reagent 11 like water and/or hydrogen peroxide and is oxidized in the oxygen supplying reagent 11 in the container 12. The solid-state material 10 is a metallic aluminum. The metallic aluminum may be, for example, is selected from the group consisting of a strip of aluminum, a rod of aluminum, a pellet of aluminum, a tube of aluminum and a powder of aluminum and may be substantially pure aluminum or may contain other materials in the way of impurities or alloys so long as they do not impede the oxidation process and action of the passivating-oxide preventing agent 13. The aluminum ordinarily forms an oxide coating upon exposure to the atmosphere, completely passivating the surface and inhibiting further oxidation. However, at a temperature sufficient to keep the passivating-oxide preventing agent 13 in a liquid state, the passivating-oxide preventing agent 13 dissolves a portion of aluminum 14 thereby breaking up and preventing the formation of the oxide layer. This disruption of the oxide formation/depositation allows the oxidation reaction in the container 12 to continue and consume more of the solid-state material 10. The aluminum 14 saturated in the passivating-oxide preventing agent 13 is reacted with the oxygen supplying reagent 11 to split the oxygen supplying reagent 11 into hydrogen 17, the passivating oxide 18 and heat 16 until the aluminum 14 is depleted. Then, the solid-state material 10 is submerged in the passivating-oxide preventing agent 13 in such a way that the solid-state material 10 does not make direct contact with the oxygen supplying reagent 11. Thus, the process will continue until the solid-state material 10 is continuously submerged into the passivating-oxide preventing agent 13 and is converted to hydrogen 17, passivating oxide 18 and heat 16.

Products resulting from this chemical process consist of: the heat 16 and hydrogen 17 which are co-generated energy outputs; passivating-oxide preventing recovered agent 15 obtained from the passivating-oxide preventing agent 13 that is not otherwise consumed during the reaction; and the passivating oxide 18. The passivating oxide 18 can be generally converted back into the solid-state material 10 through an electrolysis procedure 19, which itself usually requires the application of electrical current and heat using a Hall reactor, for instance.

Prevention of the passivation oxide layer is accomplished by submerging the solid-state material 10 below a surface of the passivating-oxide preventing agent 13. Submerging involves the passivating-oxide preventing agent 13 spreading on the surface and adheres to the solid-state material 10. The solid-state material 10 is dissolved in the passivating-oxide preventing agent 13 and thereby the passivating-oxide preventing agent 13 saturated with the solid-state material 10. The dissolved solid-state material 10 is reacted with the oxygen supplying reagent 11 so as to generate the hydrogen 17, passivating oxide 18 and heat 16. The passivating-oxide preventing agent 13 is a gallium melt or gallium-indium liquid-phase alloy or gallium-indium-tin liquid-phase alloy.

In a preferred embodiment, an apparatus for producing hydrogen and a passivating oxide using water splitting techniques is illustrated. The apparatus includes a container that is provided with a liquid melt. The liquid melt includes molten gallium saturated with aluminum. The apparatus further includes a means for inserting a solid-state material into the molten gallium in which the solid-state material is submerged in the molten gallium without being in direct contact with water. The solid-state material is capable of dissolving in the molten gallium and reacting with the water so as to split the water into the hydrogen, passivating oxide and heat.

In one aspect of the present invention, a method for producing hydrogen and a passivating oxide using water splitting techniques is disclosed. A container is provided with a liquid melt. The liquid melt includes molten gallium saturated with aluminum. A solid-state material is inserted into the molten gallium. The container is added with water above the surface of the liquid melt. The aluminum saturated in the liquid melt reacts with the water at a water-liquid interface so as to split the water into the hydrogen, the passivating oxide and heat until the aluminum therein is depleted. The solid-state material is submerged into the molten gallium without being in direct contact with the water so that the solid-state material dissolves in the molten gallium. The dissolved solid-state material reacts with the water at the water-liquid interface so as to split the water into the hydrogen, passivating oxide and heat. The process is repeated until the solid-state material submerged is converted into the passivating oxide.

According to one embodiment of the present invention, the liquid melt used in the hydrogen generation process is enhanced by the addition of a liquid-phase gallium-indium alloy that consist essentially of about 80% (eighty percent) gallium and 20% (twenty percent) indium (80/20 (Ga/In). According to another embodiment of the present invention, the liquid melt used is a liquid-phase gallium-indium-tin alloy that consist essentially of 68% (sixty-eight percent)-22% (twenty-two percent)-10% (ten percent).

Figure 2:
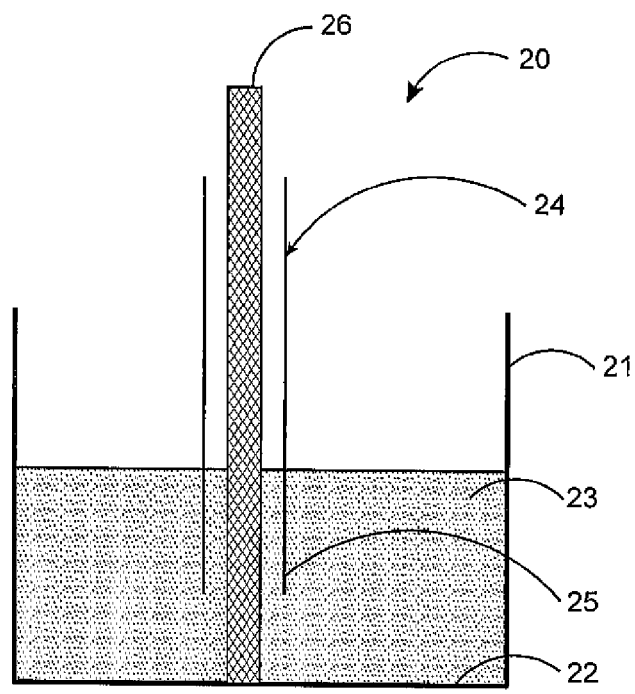
FIG. 2 illustrates an exemplary embodiment of an apparatus for producing hydrogen and a passivating oxide using water splitting techniques, showing a reactor using a solid-state material and a liquid melt.
Figure 3:
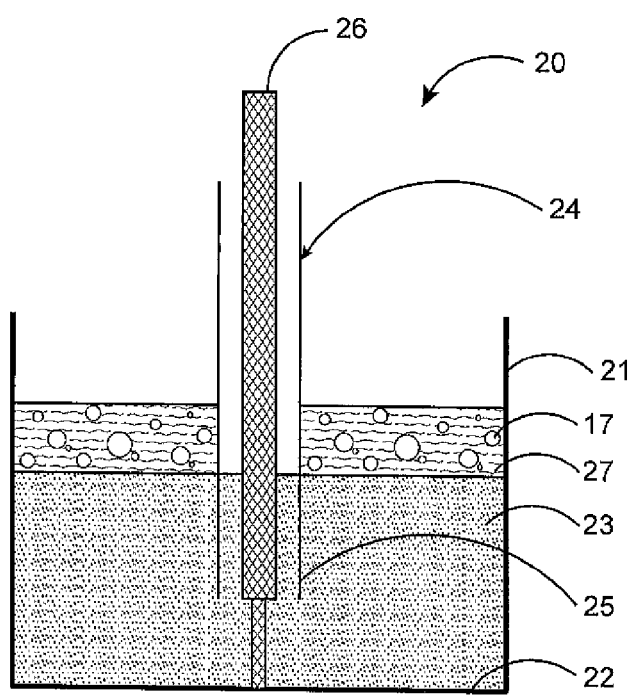
FIG. 3 illustrates the exemplary embodiment of the apparatus shown in FIG. 2, illustrating a reactor using the solid-state material, the liquid melt and water.

In one specific example illustrated in FIGS. 2 and 3, an apparatus 20 for producing hydrogen and a passivating oxide using water splitting techniques is illustrated. A liquid melt 23 of gallium formed in a reactor 21 at a temperature at or near room temperature. The reactor 21 made of a heat-resistant and pressure-resistant material is used. In the water splitting reaction, the reactor 21 is maintained at a temperature of 273-373 K and a pressure of 1-30 atm. Thus, the reactor 21 made of a heat-resistant and pressure-resistant material is used such that the water splitting reaction is stably carried out in the above temperature and pressure ranges. The heat-resistant and pressure-resistant material has an iron content of 70% or higher, or stainless steel, carbon steel, or a mixture thereof. Accordingly, when the reactor 21 is made of a material of iron and stainless steel, it will not influence reactions.

The liquid melt 23 includes molten gallium saturated with aluminum is filled in the reactor 21. A conduit 24 is placed in the reactor 21 in such a way that a bottom portion 25 thereof is placed adjacent to a bottom wall 22 of the reactor 21 wherein the bottom portion 25 of the conduit 24 having an opening therein to permit the liquid melt 23 to flow into the conduit 24. The conduit 24 may be made of water-protective sheath material. A solid-state material 26 is inserted into the conduit 24 such that it extends below the opening at the bottom portion 25 of the conduit 24. Because the solid-state material 26 is less dense but heavier than the displaced molten gallium 23 it will sink to the bottom wall 22 of the reactor 21. Thus, the solid-state material 26 is submerged below the surface of the molten gallium without the need of applying an external force. The solid-state material 26 may be segmented to facilitate semi continuous operation.

Water or hydrogen peroxide 27 is added to the reactor 21 above the surface of the liquid melt 23 and outside the conduit 24. The aluminum saturated in the molten gallium reacts with the water 27 at a water liquid interface so as to split the water 27 into the hydrogen 17, the passivating oxide and heat until the aluminum therein is depleted. The solid-state material 26 in the conduit 24 is submerged into the molten gallium without being in direct contact with the water 27. Thus, the solid-state material 26 is able to dissolve in the molten gallium that was depleted of the aluminum. The solid-state material 26 in the conduit 24 remains dry after the water 27 is added to the reactor 21 above the liquid melt 23. As the aluminum mixed with the molten gallium reacts with the water 27, it becomes depleted in the molten gallium interface. The solid-state material 26 that is placed below the bottom portion 25 of the conduit 24 is exposed to under saturated molten gallium and the solid-state material 26 begins to dissolve in the liquid melt 23. The unexposed solid-state material 26 in the conduit 24 moves into the liquid melt 23 and sustains the reaction. Thus, the solid-state material 26 dissolves continuously into the liquid melt 23 and its alloy in the presence of excess water 27 at or near room temperature to enable the continuous generation of the hydrogen 17 and the continuous production of economically important oxides of the solid-state material 26. Preferably, the solid-state material 26 is aluminum and the passivating oxide is aluminum hydroxide. In a specific process the solid-state material 26 is magnesium and the passivating oxide is magnesium oxides.

According to another embodiment disclosed in the co-pending provisional application Ser. No. 61/815,856, it has been described that Al pellets are placed in a stainless steel container. The Al pellets are immersed in excess of the solubility limit of pure Al in a liquid solution Ga, Ga,In, or Ga,In,Sn at or near room temperature. Because the aluminum is less dense than the gallium it has a tendency to float. Thus, a screen-like fixture is provided in the container to keep the Al pellets from floating and to allow the liquid solution Ga to permeate the screen. A controlled amount of water is fed into the container. As the Al dissolved in the liquid solution Ga reacts with water at the water liquid interface, the Al pellets immersed in the liquid and protected from direct exposure to water at the interface replace it. The Al pellets will continue to dissolve until they are all reacted and converted to the passivating oxides.

According to another embodiment disclosed in the co-pending provisional application Ser. No. 61/815,856, it has been described an apparatus in which a precision cylindrical rod of Al is fed into a crucible with a precision open collar at a bottom portion of a crucible whose diameter is such that it will allow the Al rod to fit tight enough so that the Ga, Ga,In, or Ga,In,Sn liquid in the crucible will not leak out in between the walls of bottom collar and the Al rod. A liquid permeable screen is placed in the neck of the open collar as a stop for the Al rod once the liquid Ga is saturated. The crucible includes a vertical extension to allow water to be fed to the crucible that containing liquid. The liquid at a bottom portion of the crucible contact with the Al rod being continuously saturated with Al and the Al submerged in the liquid does not make direct contact with the water. The dissolved Al will always react with the water if water is present in the crucible.

In yet another embodiment, magnesium is utilized as the solid-state material. Magnesium (Mg) pellets are provided in a suitable container at a predetermined rate. The container is filled with a Ga, Ga,In, or Ga,In,Sn liquid at or near room temperature in the presence of excess water. Unlike the case for Al floating on liquid Ga in the presence of excess water, the Mg pellets will continuously dissolve into the liquid Ga in the presence of water and isolated from direct contact with water, as its oxide will not form an impervious barrier that will prevent continuous Mg dissolution in excess water.

In still another embodiment, millimeter size particles of Al metal is mixed with liquid Ga, Ga,In, or Ga,In,Sn such that the composition of the Ga component with respect to the Al component is greater than 20 weight percent. The mixture is frozen and stored for later use. When in use, the mixture is heated to above the melting point of the Ga, Ga,In, or Ga,In, Sn component and the Al reacts with water to produce, hydrogen gas, alumina, and heat.

In a further embodiment, excess magnesium (Mg) and aluminum (Al) is mixed to a liquid Ga melt, both the Al and the Mg dissolve up to their solubility limit, I.e. 2-3 wt %, leaving both excess Al and Mg floating on the liquid Ga melt. When excess water is added both the floating Al and Mg continue to dissolve and split the excess water.

In accordance with one aspect of the invention, the solid-state material like Al or Mg are dissolved in a liquid-phase Ga, Ga,In or Ga,In,Sn alloy saturated with aluminum. The saturated aluminum reacted with the water added to produce the hydrogen-producing reaction. Once the reaction commences it is self-sustaining until the solid-phase Al—Ga has been consumed. A solid-state material is submerged into the liquid-phase Ga, Ga,In or Ga,In,Sn alloy in such a way that the solid-state material is prevented from direct contact with the water. The solid-state material dissolves in the liquid-phase Ga, Ga,In or Ga,In,Sn alloy and is able to react with water almost immediately at or near room temperature.

In one preferred embodiment, the lower melting point alloy is Ga,In. Other gallium alloys may be acceptable with eutectic lines below the melting point of the Al. Thus, the Al may also be dissolved in a gallium-tin (Ga,Sn) alloy since this alloy has a melting point temperature at about 19° C. Similarly, a Ga,In, Sn alloy (which has a melting point of about −20° C.) may be used with the present invention. In one specific example, favorable results were obtained with a liquid-phase alloy of 68% Ga, 22% In and 10% Sn.

It is contemplated that other alloys may be acceptable with melting points between the freezing point temperature of water and the melting point temperature of the Al. In some cases, the freezing point of the water may be lowered by an additive, such as certain salts, so that alloys with melting points below 0° C. may be acceptable, provided the alloys can be readily provided in a liquid phase.

While the invention has been illustrated and described in detail in the drawings and foregoing description, the same should be considered as illustrative and not restrictive in character. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A method for producing hydrogen and a passivating oxide using water splitting techniques comprising:
   (a) providing a container filled with a liquid melt, the liquid melt including molten gallium saturated with aluminum;
   (b) adding water to the container above a surface of the liquid melt;
   (c) reacting the aluminum saturated in the molten gallium with the water at a water-liquid interface so as to split the water into the hydrogen, passivating oxide and heat until the aluminum therein is depleted;
   (d) submerging a solid-state material into the molten gallium without being in direct contact with the water so that the solid-state material dissolves in the molten gallium;
   (e) reacting the dissolved solid-state material with the water at the water-liquid interface so as to split the water into the hydrogen, passivating oxide and heat; and
   (f) repeating the steps (d)-(e) until the solid-state material submerged is converted into the passivating oxide.

2. The method as recited in claim 1, wherein the liquid melt consists essentially of about 2%-3% (two percent to three percent) by weight of aluminum.

3. The method as recited in claim 2, wherein the passivating oxide is aluminum hydroxide and the molten gallium consists essentially of about 100% (hundred percent) by weight.

4. The method as recited in claim 1, wherein the solid state material is aluminum.

5. A method for producing hydrogen and a passivating oxide using water splitting techniques comprising:
   (a) providing a container filled with a liquid melt, the liquid melt including a gallium alloy saturated with aluminum;
   (b) inserting a solid-state material into the liquid melt;
   (c) adding water to the container above a surface of the liquid melt;
   (d) reacting the aluminum saturated in the gallium alloy with the water at a water-liquid interface so as to split the water into the hydrogen, the passivating oxide and heat until the aluminum therein is depleted;
   (e) submerging the solid-state material into the gallium alloy without being in direct contact with the water so that the solid-state material dissolves in the gallium alloy;
   (f) reacting the dissolved solid-state material with the water at the water-liquid interface so as to split the water into the hydrogen, passivating oxide and heat; and (g) repeating the steps (e)-(f) until the solid-state material submerged is converted into the passivating oxide.

6. The method as recited in claim 5, wherein the liquid melt consists essentially of about 2%-3% (two percent to three percent) by weight of aluminum.

7. The method as recited in claim 6, wherein the passivating oxide is aluminum hydroxide and the gallium alloy consists essentially of about 80% (eighty percent) gallium and 20% (twenty percent) indium (80/20 Ga/In).

8. The method as recited in claim 5, wherein the solid state material is aluminum.

9. The method as recited in claim 6 wherein the passivating oxide is aluminum hydroxide and the gallium alloy consists essentially of about 68% (sixty-eight percent) gallium, 22% (twenty-two percent) indium and 10% (ten percent) tin by weight.

10. A method for producing hydrogen and a passivating oxide using water splitting techniques comprising:
 (a) providing a container filled with a liquid-phase alloy including molten gallium saturated with aluminum;
 (b) placing a conduit into the liquid-phase alloy in such a way that a bottom portion thereof placed adjacent to a bottom wall of the container;
 (c) permitting the liquid-phase alloy to flow into the conduit through an opening at the bottom portion of the conduit;
 (d) inserting a solid-state material through the conduit into the liquid-phase alloy till below the opening at the bottom portion of the conduit;
 (e) adding water to the container above a surface of the liquid-phase alloy and outside the conduit;
 (f) reacting the aluminum saturated in the molten gallium with the water at a water-liquid interface so as to split the water into the hydrogen, passivating oxide and heat until the aluminum therein is depleted;
 (g) submerging the solid-state material in the conduit into the molten gallium without being in direct contact with the water so that the solid-state material dissolves in the molten gallium; and
 (h) reacting the dissolved solid-state material with the water at the water-liquid interface so as to split the water into the hydrogen, passivating oxide and heat; and
 (i) repeating the steps (g)-(h) until the solid-state material submerged is converted into the passivating oxide.

11. The method as recited in claim 10, wherein the liquid phase alloy consists essentially of about 2%-3% (two percent to three percent) by weight of aluminum.

12. The method as recited in claim 11, wherein the liquid phase alloy includes indium and tin.

13. The method as recited in claim 10, wherein the solid state material is aluminum.

14. The method as recited in claim 10, wherein the step of reacting the dissolved solid-state material with the water comprises:
 reacting the dissolved solid-state material in a reactor into which the water is introduced in a controlled manner.

* * * * *